US006623779B1

(12) United States Patent
Huxsoll et al.

(10) Patent No.: US 6,623,779 B1
(45) Date of Patent: Sep. 23, 2003

(54) INTERMEDIATE-MOISTURE FORMED FOOD PRODUCTS MADE FROM PARTIALLY DEHYDRATED FRUIT AND/OR VEGETABLES AND NOVEL METHODS OF PACKING THEREOF

(75) Inventors: Charles C. Huxsoll, Moraga, CA (US); Tara H. McHugh, El Cerrito, CA (US); Donald A. Olson, El Sobrante, CA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 275 days.

(21) Appl. No.: 09/774,810

(22) Filed: Jan. 30, 2001

Related U.S. Application Data

(60) Provisional application No. 60/179,589, filed on Feb. 1, 2000.

(51) Int. Cl.[7] ............................. A23L 1/072; A23L 1/06
(52) U.S. Cl. ..................... 426/573; 426/138; 426/413; 426/575; 426/577; 426/578; 426/465; 426/512; 426/640
(58) Field of Search .................. 426/573, 413, 426/615, 106, 575, 577, 578, 138, 640, 465, 512

(56) References Cited

U.S. PATENT DOCUMENTS

| | | | |
|---|---|---|---|
| 2,477,605 A | | 8/1949 | Howard et al. |
| 2,718,470 A | | 9/1955 | Kaufman et al. |
| 4,510,164 A | | 4/1985 | Staley et al. |
| 4,832,969 A | * | 5/1989 | Lioutas ................. 426/270 |
| 4,946,693 A | | 8/1990 | Risler et al. |
| 5,110,609 A | * | 5/1992 | Lewis et al. ............ 426/402 |
| 5,512,308 A | * | 4/1996 | Mishkin et al. .......... 426/93 |
| 5,723,167 A | * | 3/1998 | Lewis et al. ............ 426/640 |
| 5,840,354 A | * | 11/1998 | Baumann et al. ......... 426/74 |
| 6,027,758 A | * | 2/2000 | McHugh et al. ......... 426/615 |
| 6,077,557 A | * | 6/2000 | Gordon et al. .......... 426/573 |
| 6,183,801 B1 | | 2/2001 | Warendorf |
| 6,403,134 B1 | * | 6/2002 | Nayyar et al. .......... 426/335 |
| 6,458,405 B1 | * | 10/2002 | Roy et al. ............. 426/575 |

OTHER PUBLICATIONS

Kuntz, L.A., "Fruit Applications: Part 1," *Food Product Design* (Dec. 1992) Cover Story.

* cited by examiner

*Primary Examiner*—Nina Bhat
(74) *Attorney, Agent, or Firm*—Margaret A. Connor; Thanda Wai; John Fado

(57) ABSTRACT

The invention relates to intermediate-moisture formed food products made from a mixture of partially dehydrated fruit or vegetable pieces and a gelled matrix such that the water activity in the matrix is substantially equivalent to the water activity of the fruit or vegetable pieces in the mixture. The product may be made from one type of fruit or vegetable alone, a mixture of different fruits, a mixture of different vegetables, or a mixture of various fruit and vegetable pieces.

8 Claims, No Drawings

INTERMEDIATE-MOISTURE FORMED FOOD PRODUCTS MADE FROM PARTIALLY DEHYDRATED FRUIT AND/OR VEGETABLES AND NOVEL METHODS OF PACKING THEREOF

CROSS-REFERENCE TO RELATED APPLICATIONS

This application claims the benefit of U.S. Provisional Application No. 60/179,689, filed Feb. 1, 2000. The disclosure of said provisional application is incorporated herein by reference in its entirety.

FIELD OF THE INVENTION

The present invention relates to food products. More particularly, the present invention relates to formed food products made from fruits and/or vegetables.

BACKGROUND OF INVENTION

Fruits and vegetables are currently marketed in several forms: fresh, frozen, canned, and dehydrated.

Fresh fruits and vegetables are marketed without substantial processing. Fresh products are only washed and trimmed of most of the non-edible portions. Frequently, fresh materials are held in refrigerated storage; but even with refrigeration, storage life is usually limited to about 21 days. An offshoot of the fresh market system is the "minimally processed" or "fresh-cut" produce industry. Fresh-cut produce is essentially fresh produce that has been made into a ready-to-eat form. All non-edible tissue is removed from fresh-cut produce; however, it is not heat treated nor given any other preservation treatment that would jeopardize the fresh character. Unlike most processing systems, which add shelf life to products, fresh-cut products are more perishable than the unprocessed fresh produce.

Frozen vegetables are high quality products if processed under well-controlled conditions, but they are very susceptible to quality loss, especially texture quality, if improperly stored and handled. If storage temperatures are allowed to cycle too widely, or if the product is allowed to thaw at sometime during distribution, cellular constituents are released from cells that were damaged during the initial freezing. Some of these constituents are enzymes that promote additional breakdown of other cells. These reactions result in a soft, mushy, soggy, or spongy texture in the product upon final preparation. Fruits are much more susceptible to the adverse effects of freezing, particularly the freeze-thaw cycle, than vegetables. Consequently, a very small percentage of the fruit crops are marketed as frozen products. Many frozen fruit materials are off-grade materials from the fresh market operations. Such off-grade materials are bulk frozen and utilized in further processed products, such as jams and jellies, toppings, and beverages.

Canned fruits and vegetables accounted for the major portion of the processed fruit and vegetable market for many years until the frozen vegetable industry was established. For fruit products, canning remains the primary processing method of preservation. While canning maintains nutritional quality in the products, flavor and textural quality is often less than desired. Most quality is lost due to the long cooking time required to provide a microbiologically safe product. For low pH (or high acid) fruits, the required cooking time is not very long. The products are relatively expensive because of the care required in picking and handling the fruit and the cost of other inputs, especially the cost of metal cans.

Dehydrated products account for a relatively small percentage of the processed fruit and vegetable market. Dehydrated potatoes are sold in significant quantities, but they account for a very small part of the processed potato market. Most other dehydrated vegetables are marketed as soup or stew mixes. Dehydrated onions and garlic are produced in large quantities, but these products are used primarily in further manufactured foods, such as sausage, canned soups, or the like. The major dried fruits are raisins (dried grapes) and prunes (dried plums). Except for wines, raisins are the only processed grape product. Prunes account for essentially all of the processed plum market. Both raisins and prunes are specialty products that do not resemble the fresh grapes and plums from which they were made. Cut dried fruits (such as apricots, peaches, and pears) are considered high quality food items. They are not consumed as alternatives to fresh or other forms of the commodities. The main drawbacks to cut dried fruit is their cost and addition of sulfur dioxide is often required to maintain quality. Even in automated cut dried fruit operations, much labor is required to make these materials, thereby resulting in excessive costs, compared to other product forms.

The products of this invention are restructured intermediate-moisture materials that combine the positive attributes of frozen, canned, and dehydrated products. The adverse effects of these conventional processing systems are also eliminated or reduced. This invention results in formed products that comprise partially dehydrated fruit and/or vegetable pieces contained within a gelled matrix. The products may be pasteurized and/or frozen without adversely affecting their quality.

SUMMARY OF THE INVENTION

The present invention relates to intermediate-moisture formed food products made from a mixture of partially dehydrated fruit or vegetable pieces and a gelled matrix such that water activity or the chemical potential of the water in the gelled matrix matches that of the fruit or vegetable pieces in the mixture. The product may be made of one type of fruit or vegetable alone, a mixture of different fruits, a mixture of different vegetables, or a mixture of various fruit and vegetable pieces.

The invention is also drawn to novel methods of packaging the intermediate-moisture food products described herein. These products may be packaged into any shape such as a sausage, bar, or string cheese shape, or even a novelty item such as a Christmas tree, Easter egg, or a golfball, among numerous possibilities. Products made in the shape of a sausage may be made using standard sausage stuffer machinery.

An object of the invention is to provide an economical method of processing fruits and vegetables.

An additional object of the invention is to provide healthy and portable snacks.

Still another object of the invention is to provide an alternative form for consuming fruits and vegetables.

The present invention provides for the ability to combine flavors of different types of fruits and/or vegetables. The product may contain a mixture of different fruit pieces, different vegetable pieces, or a mixture of various fruits and vegetables pieces. The gel portion of the product may be a blend made from two or more fruits, two or more vegetables, or various combinations of different fruits and vegetables. For some applications, such as foods for infants, toddlers, or the elderly, fruit or vegetable pieces may be undesirable in the product. In these cases, it may be necessary to reduce the size of the pieces by grinding or by replacing the piece fraction entirely with concentrated purees and/or concentrated syrups. Concentrated purees and syrups are present items of commerce. The outer casing of the product mat be made from plastic, cellulose, collagen, fruit or vegetable films, or any other covering that may be used to wrap foods.

An advantage of the invention is that the product may be sliced to precise sizes for portion control in special feeding programs. The products may be utilized in desserts, condiments, snacks, side dishes, and entrees. The products are especially well suited for institutional, food service, and delicatessen systems.

Another advantage includes the use of imperfect fruits or vegetables, particularly mechanically harvested, overripe, or organically grown fruits or vegetables.

A further advantage is that excess supplies of fruits or vegetables may be used.

Still another advantage of the invention is that processing of the food products of the instant invention may take place year round because partially dehydrated fruit or vegetable pieces may be stored long term.

The scope of the present invention is not limited to the uses discussed above or to the specific examples described below.

DETAILED DESCRIPTION OF THE INVENTION

General Definitions

Water Activity is defined as the amount of unbound, free water in a system available to support biological and chemical reactions (Potter, Food Science, $4^{th}$ Ed., p. 296, AVI Publishing Co., Westport, Conn. (1986). Water activity is a concept that differs from that of absolute water content of a particular food. Sonic foods may have high levels of total water content while at the same time possess low water activity. The equation for water activity is: $A_W=VP/VP_0$, where VP is the partial vapor pressure of the food at temperature T and $VP_0$ is the saturation vapor pressure of pure water at T. This ratio provides the amount of free water present in the food expressed as the equilibrium state of the unbound water content in relation to the vapor pressure of the surrounding environment in which the food is stored under conditions of room temperature and atmospheric pressure. Substantially equivalent water activity is used here to mean water activity within the range of ±0.05.

Chemical potential (u) is defined as $u=RT\ln A_W+u_0$, wherein $u_0=RT_0\ln A_W$, R=universal gas constant, T=absolute temperature, and $T_0$=reference temperature.

A puree is a food material made by grinding a fruit or vegetable. The fruit or vegetable is usually cooked, then sieved.

A gelled matrix is a solidified colloidal system in which other materials, especially particulates, are embedded.

A continuous gelled matrix is one that does not contain interstitial spaces or air pockets.

Percent fruit or vegetable is expressed as [(weight/weight)×100].

Percent weight reduction is expressed as [(weight/weight)×100].

Partially dehydrated fruit or vegetable pieces may be obtained by dehydrofreezing, dehydrocanning, osmotic dehydration, freeze drying, or other methods well known to the food industry.

Dehydrofreezing is the process whereby a portion of the water is removed from a food product prior to freezing. The portion removed is usually in the range of 45 to 80% (w/w).

Blanching is the process of heating a material. In food processing, blanching is usually accomplished with steam or hot water to attain a specific effect, such as to inactivate enzymes, expel air from a product, or tenderize a material. In this particular process, blanching is done in a steam heating chamber, primarily to inactivate enzymes and expel air; however, some texture modification also occurs.

Leathers have water activities in the range of 0.4 to 0.8.

Fruit or vegetable films have water activities in the range of 0.4 to 0.8.

"Stand-alone" refers to a product texture which does not deform under gravity. When placed on a table, the product will maintain its shape and structure.

By "piece" of fruit and/or vegetable, we mean a naturally-harvested edible portion of a plant that may be whole or coarsely subdivided, wherein the cellular integrity is substantially intact. The layer of cells disrupted by the act of subdivision (i.e., cutting, slicing, or comminution) will be destroyed; however, the tissue will be substantially intact, although the cells may be processed by dehydration, freezing, or canning).

The present invention relates to a method for producing intermediate-moisture formed food products made from a mixture of partially dehydrated fruit or vegetable pieces and a gel matrix, wherein the water activity or chemical potential of the water in the gelled matrix is substantially equivalent to that of the fruit or vegetable pieces in the mixture; and to intermediate-moisture formed food products made from such a process.

More specifically, the invention is drawn to a method of producing intermediate-moisture formed food products made from a mixture of partially dehydrated fruit or vegetable pieces and a gelled matrix, the method comprising the steps: (a) mixing partially dehydrated fruit and/or vegetable pieces with a fruit and/or vegetable gel, and (b) allowing sufficient time for the gel to become a gelled matrix, wherein water activity of the gelled matrix is substantially equivalent to the water activity of the fruit or vegetable pieces in the mixture.

The invention will be better understood with the aid of the description, which follows and in which reference is made to exemplary embodiments of intermediate-moisture formed foods made from partially dehydrated fruit or vegetable pieces.

It should be clearly understood, however, that these examples are given solely by way of illustration of the objects of the invention, and that they do not in any way constitute limitations thereof.

In the application of the process, raw fruits and/or vegetables are prepared, by peeling cutting, trimming, or the like. They are partially dehydrated and frozen (dehydrofrozen) and stored in bulk, as partially processed materials, for subsequent final processing. While any dehydration method (such as sun drying, vacuum drying, hot air drying, tunnel drying, freeze drying, and drum drying) may be used, air-drying is the most preferred. Prior to drying, the materials are usually immersed in a dip consisting of "generally regarded as safe" (GRAS) substances, such as ascorbic acid, citric acid, or calcium chloride. These dips retard adverse color changes in the product during the dehydration process. At some point in the process prior to freezing, the product may be blanched. Blanching inactivates enzymes that may have deleterious quality effects during storage; it also tends to remove air from within the products, thereby reducing subsequent oxidation.

For final processing, the dehydrofrozen materials are thawed, a gel solution consisting of fruit/vegetable juice/ puree is prepared, and the thawed pieces and the gel are mixed. The gel/fruit/vegetable pieces are formed by stuffing the mixture into standard casings. The vacuum sausage stuffer has an advantage over other forming devices because it removes interstitial air from the product. This limits the oxygen in the material, which reduces subsequent oxidation of the final product.

The casing may be made from a variety of materials similar to those used in the meat sausage industry, ranging from plastics to cellulose- or collagen-based casings, to natural casings, such as collagen. Selection of a casino material will depend upon the additional processing and storage operations, as well as the culinary niche the product is expected to fill. For example, if the product is to be pasteurized, a heat-stable plastic casing may be selected. If the product is to be eaten out of hand, as a snack, an edible collagen-based casing may be chosen.

The water activity of the product is one of the main parameters dictating the steps and conditions in the process. Pure water has a water activity of 1.000. Most fresh fruits and vegetables have water activities approaching 1.0, many are near 0.99. This is an important parameter because it defines the chemical potential of the water in the product. This in turn determines the kind of structure that occurs upon freezing. Dried fruits, such as raisins, have a water activity of about 0.5 to 0.6.

Products of this invention have water activities in the range of about 0.55 to 0.98. The products of this invention may be divided into two categories: (1) shelf-stable products that require no freezing or refrigeration, and (2) perishable products which require freezing or refrigeration to prevent spoilage. Shelf-stable products normally have an $A_W$ of 0.65 or less. Most perishable products have $A_W$ above 0.80. To achieve these water activity levels, about 50 to over 80% (w/w) of the water contained in the raw product must be removed by drying. Raw products vary quite widely in their solids, or moisture contents. Many fruits are in the range of 10 to 15% (w/w) solids; however, some fruits, such as grapes and prune-type plums may have nearly 25% (w/w) solids. Removing about 50% (w/w) of their moisture would yield materials with the water activities required for the products to be marketed as perishable items. Some commodities, such as tomatoes, have lower solids contents, and a larger portion of the initial water must be removed.

Method of Preparation

Raw fruits or vegetables are prepared by standard peeling and trimming operations. One important feature of this invention is that it does not require perfect starting material. Substantial defects and undersized raw products may be tolerated, because it is subsequently cut into smaller pieces, and piece identity is less important than for other product forms. This, in turn, makes mechanical or electronic removal of defects viable. Further, organically grown fruits or vegetables, which tend to be imperfect for the fresh fruit or vegetable market, may be used as starting materials to make organically grown intermediate-moisture formed food products described herein. After initial preparation, the material is reduced in size using a standard cutter. For purposes of experimentation, a food service sized food processor was used. The pieces may be cut into about ⅜-inch dice or ⅛ inch×1 inch×1-inch slices. The specific size of the pieces may be varied to alter the final product texture, but the pieces should be as small as possible to yield rapid and efficient drying.

Drying is typically conducted at about 70° C. Pieces with about ⅛ inch thickness will require about 30 to 60 minutes drying to remove about 50% (w/w) of their water. But these times will be variable depending upon the kind of dryer that is used.

Blanching, if used, is normally done when 25 to 50% (w/w) of the water has been removed. Partially drying prior to blanching tends to reduce the "cooking effect" which may adversely affect the texture of the final product. Blanching temperatures are kept as low as possible, to also reduce adverse effects on texture. Normally a blanching temperature of about 80° C. is used. Blanching is usually accomplished in about 5 to 8 minutes, but like drying, the blanching time will depend upon the specifications of the blancher. For some products, adverse enzyme reactions may occur in the initial drying period prior to blanching. For these products, it may be necessary to blanch prior to drying. Because enzyme inactivation is a time-temperature reaction, blanching of the raw product may be accomplished without adverse textural effects by reducing the blanching temperature and increasing the blanching time. For most fruits and vegetables, the rate of softening is reduced more than the rate of enzyme inactivation by lowering the blanching temperature.

When drying and/or blanching are complete, the product is cooled and frozen. Because of the moisture reduction and lowering of the water activity, the method of freezing is not as critical as for materials at full moisture content. These materials may be frozen, thawed, and refrozen with little adverse effects on their quality. For purposes of experimentation, the partially dried materials were placed in 4-gallon plastic food buckets and bulk-frozen in a freezer.

To make the final product, the frozen pieces are thawed and brought to about ambient temperature. Depending upon the kind of product to be made, the moisture content may be further adjusted to the desired level by additional dehydration or by rehydration. A gel mixture is prepared. Preparation of the gel will depend upon the type of gel agent that is being used. Potential gel agents include pectin, starch, gums, alginates, or combinations of these. Some products do not require the addition of a gel agent. Most experimentation has been with alginates, because they provide gels that are thermally stable, and they have good freeze-thaw stability. The gel and piece materials are blended together, usually in ratios up to 90% (w/w) fruit and/or vegetable pieces and 10% (w/w) to 100% (w/w) gel; more preferably 10 to 90% (w/w) fruit and/or vegetable pieces and 10% to 90% (w/w) gel; and most preferably 60% (w/w) to 70% (w/w) fruit and/or vegetable pieces and 30%) (w/w) to 40% (w/w) gel. The gel is a combination of juice, puree, or ground pieces and, when required, a gel agent, so that the final formed product may contain up to 100% (w/w) fruit or vegetable solids.

Perishable products may be held in frozen storage or refrigerated. If the gel is formulated to withstand freeze-thaw cycles, there is an advantage to using frozen storage because the product may be held longer before it must be sold or consumed. The products could be marketed as frozen items, or they could be thawed and sold in refrigerated form. If freezing is not desired the products could be made to market demands and handled as any other perishable refrigerated product. When low-acid materials are being used as ingredients, it would be necessary to adjust the pH to ensure that no food safety hazard could occur, especially *C. botulinum*. For most fruit products, pH is not a major concern, but it could be a serious problem for vegetables.

Shelf-stable products usually do not require a gel agent. They are typically made by infusing concentrated fruit/ vegetable syrups into the partially dried pieces. The syrups impart a desirable texture to the pieces, making them more tender at low $A_W$. The fresh fruit syrups also impart a fresh-like flavor character to the products. Following infusion, the $A_W$ may be adjusted by further dehydration, such as low temperature drying. Some of the infused pieces may be ground to form paste which, when recombined with remaining pieces acts as a matrix to bind the pieces together, without the addition of a gel agent.

Typical Method for Product Formation

Perishable products that require refrigerated or frozen storage may be made as follows. The piece-gel mixture is placed into the hopper of the forming device. For experimentation, a VEMAG vacuum sausage stuffer was used. The VEMAG can be fitted with many size and shapes of horns. To provide consistency, a 22-millimeter cylindrical horn was employed, and a plastic, heat-stable casing was used for all testing. The VEMAG removes the interstitial air from the mixture and pumps it through the forming horn and into the casing. A metal clipping device (Tipper-Tie) is used to seal the ends of the casings, but other tying devices could be used.

After filling the casings, the products are placed in refrigeration to allow the gel to "set". After the gel has set, the product may be pasteurized to extend shelf life. For purpose of experimentation, pasteurization was accomplished by placing the cased product in a pilot steam blancher at 80° C. for about 40 minutes. The pasteurization time is strongly dependent upon the size of the casing and the temperature that the product may tolerate.

Shelf-stable products may be made as follows.

The pieces and ground paste are blended and placed in the hopper of the Vemag. The products may be formed and packaged as previously described for perishable products. Because these products may be consumed as an out of hand snack, they may be formed into relatively small units that would typify a single serving. In this case, a linker device is attached to the Vemag, which may be adjusted to form products of consistent size by twisting the casing and separating the units as in is done in the manufacture of linked meat sausage. An edible casing, such as a collagen meat casing, may be used to yield a product that may be consumed in its entirety, without the need to dispose of the casing.

Typical Formulations

Example 1—Plum-Apple Gel

Gel: 40% (w/w) of total 69.3% (w/w) Apple juice 25.0% (w/w) Sucrose 2.5% (w/w) GDL (glucono delta lactone)

1.5% (w/w) Alginate 1.5% (w/w) TSPP (tetrasodium pyrophosphate)

0.2% (w/w) Ca sulfate dihydrate

Fruit: 60% (w/w) of total: Plums dried to 60% (w/w) weight reduction

Example 2—Apple Gels

Gel: 25–40% (w/w) of total 69.3% (w/w) Apple juice 25.0% (w/w) Sucrose 2.5% (w/w) GDL 1.5% (w/w) Alginate 1.5% (w/w) TSPP 0.2% (w/w) Ca sulfate dihydrate Fruit: 60–75% (w/w) of total: Apples 60% (w/w) weight reduction Example 3—Apple Sauce Gel Gel: Total System.

50% (w/w) Apple sauce 34.3% (w/w) Apple juice

10% (w/w) Drum dried apple 2.5% (w/w) GDL (Glucono Delta Lactone)

1.5% (w/w) Alginate 1.5% (w/w) TSPP 0.2% (w/w) Ca sulfate dihydrate

Example 4—Apricot Gel

Gel: 30–40% (w/w) of total 79.3% (w/w) Apricot nectar 15.0% (w/w) Sucrose 2.5% (w/w) GDL 1.5% (w/w) Alginate 1.5% (w/w) TSPP 0.2% (w/w) Ca sulfate dihydrate Fruit: 60–70% (w/w) of total: Apricots 60–80% (w/w) weight reduction Example 5—Peach Alginate Gels: 60% (w/w) Fruit

| 1500 g Alginate mix | | formula 1 | formula 2 |
|---|---|---|---|
| 1189.5 | g Kerns peach nectar | 79.3% (w/w) | 69.1% (w/w) |
| 225 | g sucrose | 15.0% (w/w) | 25.0% (w/w) |
| 37.5 | g GDL | 2.5% (w/w) | 2.5% (w/w) |
| 22.5 | g Alginate | 1.5% (w/w) | 1.5% (w/w) |
| 22.5 | g TSPP | 1.5% (w/w) | 1.5% (w/w) |
| 3 | g Ca Sulfate Dihydrate | 0.2% (w/w) | 0.2% (w/w) |
| 3 | g Peach flavor | | 0.2% (w/w) |
| 3750 | g total mixture | | |
| 1500 | g Alginate mix | | |
| 2250 | g partially dried peaches (5 lbs) | | |

Example 6—Peach Gel

Gel—100% (w/w) of total 70.1% (w/w) Peach juice 18° Brix 0.2% (w/w) Natural Peach flavor 25% (w/w) White Grape concentrate 2.5% (w/w) GDL 2.0% (w/w) Alginate 0.2% (w/w) Calcium Sulfate Dihydrate Example 7—Tomato Alginate Gels: 60% (w/w) tomato pieces 69.3% (w/w) Tomato juice 25.0% (w/w) Sucrose 2.5% (w/w) GDL 1.5% (w/w) Alinate 1.5% (w/w) TSPP 0.2% (w/w) Ca sulfate dihydrate Tomatoes dried to 75–80% (w/w) weight reduction.

Example 8—Carrot-Apple Gel

| Gel # | Gel #2 | |
|---|---|---|
| 84.5% (w/w) | 64.5% (w/w) | Carrot-Apple Juice (1:1 blend on w/w basis) |
| None | 25% (w/w) | Apple Puree (38° Brix) |
| 10% (w/w) | 5% (w/w) | Drum-dried Carrot & Apple Flakes (1:1 blend, w/w) |
| 4% (w/w) | 4% (w/w) | GDL |
| 1.5% (w/w) | 1.5% (w/w) | Alginate |

Example 9—Carrot-Apple Gel
64.5% (w/w) Carrot-Apple Juice (50/50 blend)
15% (w/w) Apple Puree
15% (w/w) Carrot Puree
4% (w/w) GDL
1.5% (w/w) Alginate Example 10—Shelf-stable Plum Product 25 pounds Pitted Dehydrofrozen plums (Fresh plums were blanched at 80° C. for 10 minutes, dried to 50% (w/w) weight reduction at 80° C., and frozen $A_W$=0.89, moisture=47% (w/w))
  Thawed dehydrofrozen plums were infused with fresh plum concentrate, 7 70° Brix,
  Infused plums: $A_W$=0.82, moisture=35% (w/w).
  Weight of infused plums=26.5 pounds (Net weight gain=5% (w/w).)
  Infused plums air-dried at 60° C. Final weight=21.2 pounds, $A_W$=0.62.

Formulation:

6.4 pounds Dried, infused plums (30% (w/w) of total) ground through food grinder (⅛-inch plate)
14.8 pounds Dried, infused plum pieces.

Plum pieces and ground plums were mixed and then formed into edible collagen casings, approximately 12 mm diameter, using the Vemag vacuum sausage stuffer.

REFERENCES

U.S. Patent No. 2,477,605.
U.S. Patent No. 2,718,470.
U.S. Patent No. 5,110,609.
Kelco, Division of Merck & Co., Inc. (San Diego, Calif.), Alginate products for scientific water control, Catalog, 3$^{rd}$ edition.
Powers, M. J., Talburt, W. F., Jackson, R., and Lazar, M. E., Dehydrocanned Apples. Food Technology, August: 417–419 (1958).

The references cited above and throughout the specification are incorporated by reference in their entirety.

We claim:

1. A method of producing intermediate-moisture formed food products made from a mixture of partially dehydrated fruit or vegetable pieces and a gelled matrix, the method comprising the steps:

(a) mixing partially dehydrated fruit or vegetable pieces with a fruit or vegetable gel, and
   (b) allowing sufficient time for the gel to become a gelled matrix, and
   (c) forming the food products in a casing;
      wherein water activity of the gelled matrix is substantially equivalent to the water activity of the fruit or vegetable pieces in the mixture; wherein the water activity ranges from 0.55 to 0.98, and wherein the percentage of fruit or vegetable pieces is up to 90% (w/w).

2. The method of claim 1, wherein the casing is made from a material selected from plastic, cellulose, collagen, or fruit or vegetable films.

3. The method of claim 1, wherein the casing is in the shape of a sausage.

4. The method of claim 1, wherein the step of forming the food product in a casing is performed under vacuum.

5. The method of claim 1, wherein the step of forming the food product is performed in a sausage stuffer machine.

6. An intermediate-moisture formed food product made from a mixture of partially dehydrated fruit or vegetable pieces and a gelled matrix, wherein water activity of the matrix is substantially equivalent to the water activity of the fruit or vegetable pieces in the mixture; wherein the water activity ranges from 0.55 to 0.98; wherein the percentage of fruit or vegetable pieces is up to 90% (w/w), and wherein the pieces and matrix are surrounded by a casing.

7. The food product of claim 6, wherein the casing is made from a material selected from plastic, cellulose, collagen, or fruit or vegetable films.

8. The food product of claim 6, wherein the casing is in the shape of a sausage.

* * * * *